US008515566B2

(12) United States Patent
Ford

(10) Patent No.: US 8,515,566 B2
(45) Date of Patent: *Aug. 20, 2013

(54) SEQUENCE GRABBER FOR AUDIO CONTENT

(75) Inventor: Bradley D. Ford, San Jose, CA (US)

(73) Assignee: Apple Inc., Cupertino, CA (US)

(*) Notice: Subject to any disclaimer, the term of this patent is extended or adjusted under 35 U.S.C. 154(b) by 270 days.

This patent is subject to a terminal disclaimer.

(21) Appl. No.: 12/850,438

(22) Filed: Aug. 4, 2010

(65) Prior Publication Data

US 2010/0318206 A1 Dec. 16, 2010

Related U.S. Application Data

(63) Continuation of application No. 11/158,482, filed on Jun. 21, 2005, now Pat. No. 7,774,077.

(51) Int. Cl.
*G06F 17/00* (2006.01)
*G06F 13/00* (2006.01)
*G06F 13/28* (2006.01)
*H04B 3/00* (2006.01)
*H04N 7/173* (2011.01)
*H04N 7/16* (2011.01)

(52) U.S. Cl.
USPC .............. 700/94; 381/80; 711/110; 725/94; 725/145

(58) Field of Classification Search
USPC ........ 381/80–81; 700/94; 710/56; 711/110; 725/38, 86–84, 94, 145
See application file for complete search history.

(56) References Cited

U.S. PATENT DOCUMENTS

| 4,700,391 | A | 10/1987 | Leslie et al. |
| 4,908,825 | A * | 3/1990 | Vea ............................. 370/526 |
| 5,524,111 | A * | 6/1996 | Le Pennec et al. ........... 370/465 |
| 5,973,722 | A | 10/1999 | Wakai et al. |
| 7,320,025 | B1 | 1/2008 | Steinberg et al. |
| 2003/0084442 | A1 | 5/2003 | Kellner et al. |
| 2004/0153510 | A1 | 8/2004 | Riddle |
| 2006/0074637 | A1 | 4/2006 | Berreth |
| 2006/0080707 | A1 | 4/2006 | Laksono |

* cited by examiner

*Primary Examiner* — Jesse Elbin
(74) *Attorney, Agent, or Firm* — Blakely, Sokoloff, Taylor & Zafman LLP

(57) ABSTRACT

An audio context object gathers multiple channels of audio data from an audio device and stores each channel of data separately in a ring buffer. Clients of the audio context can request any number of channels of data at any interval from the audio context. Multiple clients can share the same audio device. The ring buffer used by the audio context object stores the channels of audio data in a two-dimensional array such that each channel of audio data is stored in contiguous memory.

40 Claims, 5 Drawing Sheets

SEQUENCE GRABBER FOR AUDIO CONTENT

PRIORITY CLAIM; CROSS-REFERENCE TO RELATED APPLICATION(S)

This application claims the benefit as a Continuation of application Ser. No. 11/158,482, filed Jun. 21, 2005 now U.S. Pat. No. 7,774,077 the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

TECHNICAL FIELD

The present invention relates to multi-media digital data, and more specifically, obtaining multiple channels of audio data for multiple clients.

BACKGROUND

Multimedia applications capture and playback various types of video and audio data. For instance, a multimedia application may capture video and/or audio data from various types of cameras, or from various devices connected to a computer. Audio, video and other types of media data may be acquired from many different types of sources and devices. In order to support capturing audio and video data from many different types of devices, a component-based architecture is frequently used.

In a component-based architecture, applications call certain functions in an operating system component manager to perform high-level operations. For instance, a component-based multimedia application that creates movies may call a "record" function provided in the component manager to start recording from a device, a "pause" function provided in the component manager to pause recording, etc. An application makes these calls without regard to what type of device is being used. By using a component-based architecture, an application does not have to know how to communicate directly with many different types of devices, instead it only communicates with the component manager.

One type of component that can be used to capture audio and video data is a "sequence grabber." A sequence grabber component is used to "grab", capture or obtain a sequence of digitized data, such as a sequence of video images or a sequence of audio samples. For example, a sequence grabber component can be used by an application to obtain video or audio data for use in a movie that the application is creating, and save the data as tracks in movie files.

An application instantiates a sequence grabber component to create the top-level object through which the application controls how the data is obtained through high-level commands. Through the sequence grabber component, a lower-level component called a "sequence grabber channel component" is created to handle the acquisition of a channel of media data of a particular type. For example, an "audio" sequence grabber channel component records a channel of audio or sound data, and a "video" sequence grabber channel component records a channel of video data.

Current sequence grabber channel component implementations are limited. While different types of channels (e.g., one audio type channel and one video type channel) can simultaneously record from the same device, it is not possible to have two instantiations of an audio sequence grabber channel component recording from a single device. In addition, while known audio sequence grabber channel components can record audio data in stereo (i.e., audio data received from two channels), current audio sequence grabber channel components cannot grab more than two channels of audio data. Furthermore, current audio sequence grabber channels are not capable of sampling at a rate greater than 65 kHz.

Audio data today can be very large due to higher channel counts, higher sampling rates and wider sample bit depths. In particular, many devices generate multiple channels of audio data, such as 8 to 24 channels. High end devices may generate even more channels of audio data. Newer multimedia applications, such as internet broadcast streaming, have complex audio recording requirements. For example, a multimedia application may need to be able to simultaneously record multiple channels of audio data in various formats. A multi-channel audio sequence grabbing component is needed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Sequence Grabber

A sequence grabber component implements the basic functionality of media capture for an application. Sequence grabber components allow applications to obtain digitized data from external sources or devices without communicating directly with any device drivers. An application instantiates a sequence grabber component to create the object through which it captures video or audio data from an external source. Once instantiated, the application communicates with the sequence grabber through high-level commands, such as "start recording", "stop recording", "pause", etc.

Figure 1:
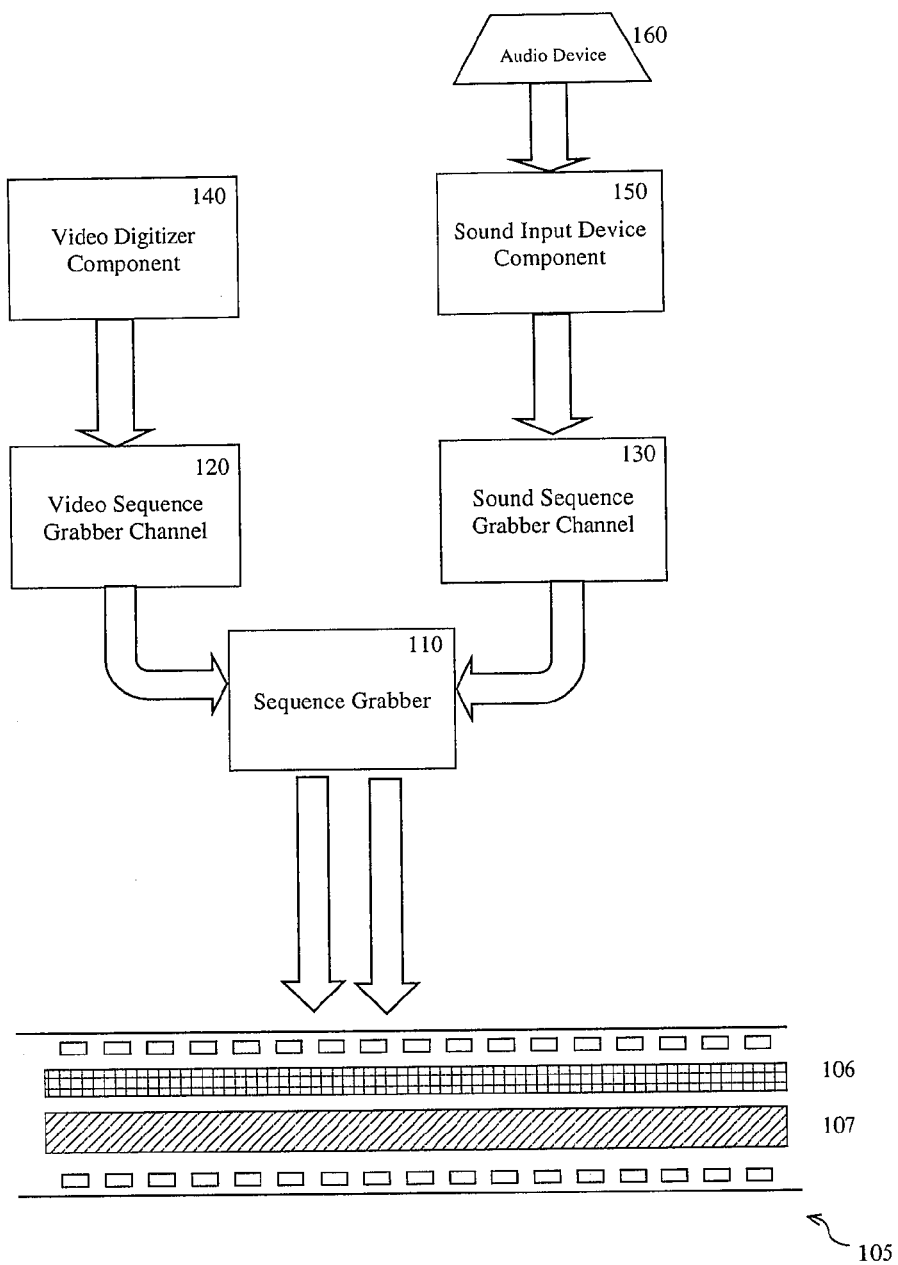
FIG. 1 is a block diagram of a system in which a sequence grabber component is used in an application that creates a movie.

FIG. 1 illustrates how an example application that is creating a movie 105 with at least two tracks 106, 107 uses a sequence grabber component 110 to obtain media tracks for the movie. As shown in FIG. 1, in order to handle specific media-related functions, the sequence grabber calls on various sequence grabber channel components. Typically, different sequence grabber channel components are used for different types of media; for example, a 'video' sequence grabber channel component to capture video data, a 'sound' sequence grabber channel component to capture sound or audio data, etc. Although not shown in FIG. 1, other types of sequence grabber channel components may be used for other types of media (e.g., text, Musical Instrument Digital Interface (MIDI), etc.).

In the example system shown in FIG. 1, video sequence grabber channel component 120 records video data by communicating with video digitizer component 140, and sound sequence grabber channel component 130 records audio data by communicating with sound input device component 150. The video sequence grabber channel component 120 and the sound sequence grabber channel component 130 present media data at regular intervals to the sequence grabber 110, which may save the media data as tracks 106, 107 in movie 105.

Sound input device component 150 is typically a low-level system component that is designed to communicate directly with sound input hardware, such as audio device 160. This insulates all other components from having know anything about the current sound input hardware. For example, sound sequence grabber channel component 130 will simply receive a stream of bytes from sound input device component 150, irrespective of what type of device the audio device 160 is. An example sound input device component may be the Sound Manager component available from Apple Computer, Inc. of Cupertino, Calif. Alternatively, the example sound input device component may be a Core Audio HAL (Hardware Abstraction Layer) audio device driver, also available form Apple. Other sound input device components can be used, or third-party developers can write sound input device components to handle communication with particular devices.

Known sound sequence grabber channel components typically grab sequences of audio samples from the first, second or the first and second channels of an audio recording device, regardless of the number of audio channels it supports at the driver level. They cannot record from multiple devices or record more than stereo (i.e., first two channels) from a device that generates multiple channels. If audio device 160 is a modular digital multitrack device, such as an 8-channel ADAT deck, for example, sound sequence grabber channel 130 can only grab, at most, two channels of the eight channels produced by the ADAT deck.

Furthermore, multiple instantiations of sound sequence grabber channel components cause errors, and therefore cannot be used to record additional channels. The techniques disclosed herein overcome these limitations and provide multi-channel high resolution audio capture capability.

Figure 2:
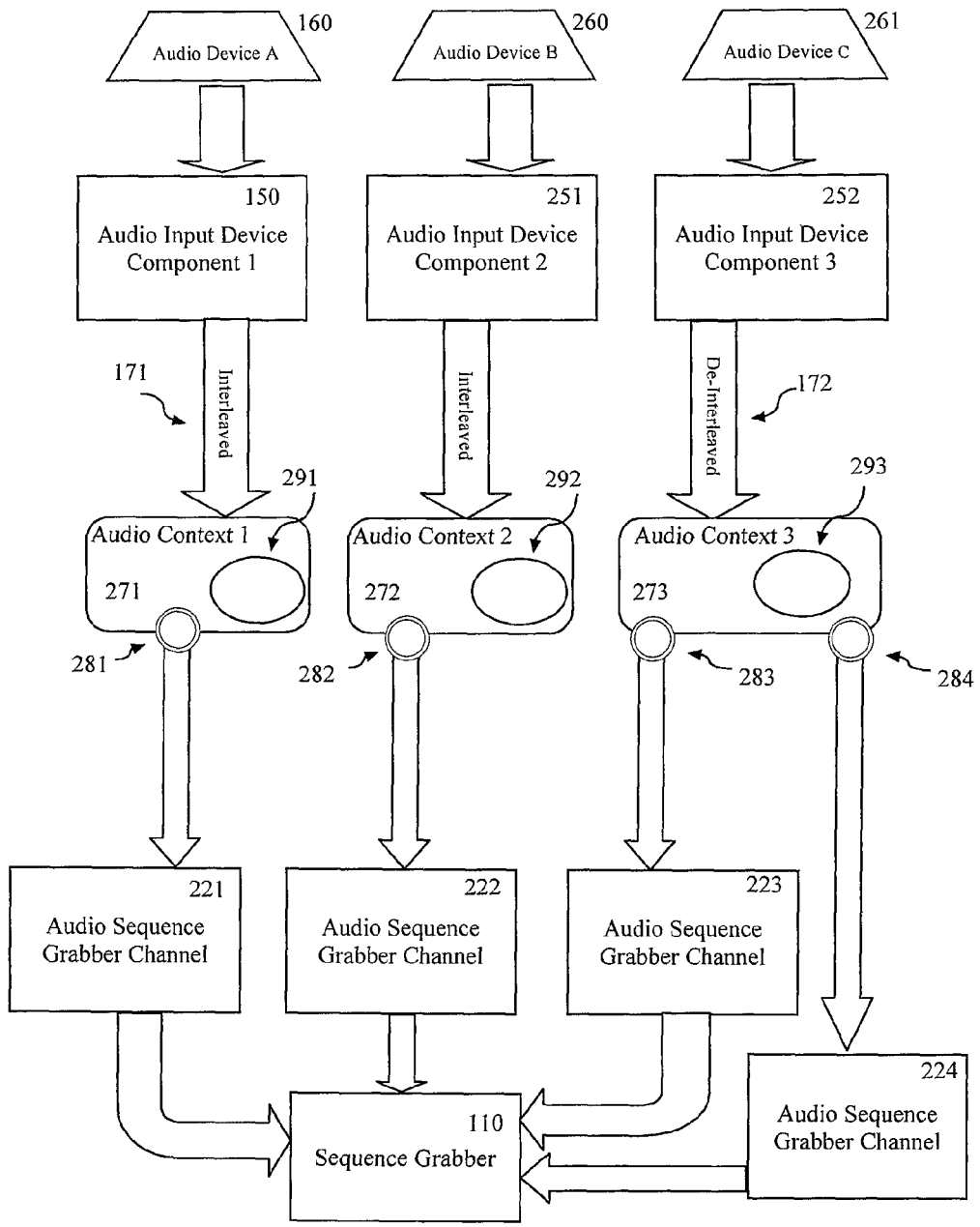
FIG. 2 is a block diagram of a system in which multiple instantiations of audio sequence grabber channels communicate with an audio context object to grab multiple channels of audio data from multiple devices.

FIG. 2 illustrates how a sequence grabber channel component implemented using the techniques disclosed herein can be used to capture multiple channels of audio data. In order to differentiate this sequence grabber channel component from the sound sequence grabber channel component of FIG. 1, the sequence grabber channel component implemented using techniques disclosed herein is called "Audio Sequence Grabber Channel" in FIG. 2, and will be abbreviated as "Audio SGChannel" herein.

Unlike sound sequence grabber channel components, multiple instantiations of Audio SGChannel components are possible, as illustrated in FIG. 2 by Audio SGChannels 221, 222, 223 and 224. Multiple instantiations of Audio SGChannels allow an application to grab multiple channels of audio data at the same time. For example, sequence grabber 110 can use the four instantiations of Audio SGChannel of FIG. 2 to record data for four separate audio tracks in a movie. FIG. 2 illustrates only one example embodiment, and more or fewer Audio SGChannels are possible.

As shown in FIG. 2, the source to each Audio SGChannel is independent of any other Audio SGChannel. This allows for a great deal of flexibility in capturing and using tracks of audio. For example, a user can capture multiple channels of audio from the same device, as shown by Audio SGChannels 223 and 224, and use the channels as multiple tracks in a movie. As another example, a user can capture multiple channels of audio from different devices to use as tracks in a movie. Many configurations and uses will be apparent to those skilled in the art.

Significantly, in one embodiment the device layer that an Audio SGChannel communicates with is abstracted into an "audio context" object. Each Audio SGChannel grabs sequences of audio data from audio devices 160, 260 and 261 through audio contexts 291, 292 and 293, respectively. Each audio context 291, 292, 293 provides a common interface for audio data coming from an input audio device, such that the audio context acts as if it is the input audio device component to each of the Audio SGChannels.

Each per-device audio context may be shared among multiple clients. For example, audio context 293, associated with device 261, is shared by Audio SGChannels 223 and 224.

In one embodiment, in order to support a large number of audio devices, audio context 291, 292, 293 may receive audio data from different types of audio input device components. For example, input device component 150 may be Sound Manager Sound Input Component from Apple Computer, Inc., input device component 251 may be the CoreAudio HAL driver component available in MAC OS X from Apple Computer, Inc., and input device component 252 may be a DirectSound Application Programming Interface (API) device from Microsoft, Inc., of Redmond, Wash. FIG. 2 is merely an example, and many configurations are possible.

In the example shown in FIG. 2, Device A 160 may be an older device which is only supported by Sound Manager, Device B 260 may be a device for which higher resolution CoreAudio support is provided, and Device C 261 may be a device for which only Direct Sound support is provided. Furthermore, hardware-specific audio input device components may be developed to communicate with specific devices. Because audio context can communicate with multiple audio input device components, Audio SGChannels are able to grab data from any type of device as long as it is supported by at least one audio input device component.

By having audio contexts 291, 292 and 293, Audio SGChannels can share a common input device without interfering with each other. For example, as shown in FIG. 2, audio context 293 is shared by Audio SGChannels 223 and 224. As a client of audio context, an Audio SGChannel does not need to know what type of device input is coming from, which audio input device component is being used to communicate with the device or even whether other instantiations of Audio SGChannels might be receiving data from the same device. For example, Audio SGChannels 223 and 224 may both be grabbing sequences of audio samples from Audio Device C (261) through audio context 293. Multiple instantiations of Audio SGChannel may request data from the same input device, or they may request data from different input devices. In addition, different instantiations of Audio SGChannel may request the same channels from a device, or they can request different channels.

In order to allow multiple instantiations of Audio SGChannel components, in one embodiment each Audio SGChannel creates its own audio context reference. Each connection from an Audio SGChannel client to the audio context is identified with a different connection identifier ("id"), even though different Audio SGChannels may ultimately be communicating with the same device. Separate connection ids (id) 281, 282, 283 and 284 are shown in FIG. 2 for Audio SGChannels 221, 222, 223 and 224, respectively.

An audio sequence grabber channel component that can record multiple channels of audio is useful in many situations. For example, suppose a computer is set up with three 8-channel ADAT decks, thereby providing a total potential input of 24 channels. In one embodiment, a first Audio SGChannel grabs audio data from the first deck, a second Audio SGChannel grabs data from the second deck, and a third Audio SGChannel grabs data from the third deck. Sequence grabber component 110 can gather data from the three devices through the multiple instantiations of Audio SGChannel, and write the audio from different devices to the same movie file. Alternatively, the audio can be used in separate movie files. Many variations are possible.

Each audio context receives input audio data from an audio input device component and places the data in a buffer. For example, audio context 291 includes ring buffer 291, and audio data from input device component 150 is placed in this ring buffer. Specific ring buffer techniques that can be used are discussed in detail below. As discussed in more details below, the audio data is placed in the ring buffer of an audio context after being de-interleaved, if necessary, and converted to 32-bit floating point, if necessary.

Audio input device components 150, 251, 252 may provide multiple channels of audio data to audio context as either interleaved audio data, or de-interleaved channels of audio data. For example, FIG. 2 illustrates that audio input device 150 delivers data as interleaved data (171), and audio input device 252 delivers data already de-interleaved (172). Audio context can handle either case, so that different kinds of audio input device components can be used with an audio context. If an audio input device component provides data to audio context in de-interleaved format, audio context stores each channel of data separately. If the input audio data from an audio input device is interleaved, audio context de-interleaves the data before storing each channel of data separately in the buffer. Either way, all channels of audio data from the input audio device are stored separately in the ring buffer. As audio context stores the data de-interleaved, Audio SGChannel clients do not need to de-interleave audio data grabbed from audio context, whether the audio data was originally interleaved or not.

Audio context queues all audio data coming from the input device components. However, Audi SGChannel clients do not always have to grab all channels gathered and stored by audio context. Audio SGChannels can request any subset of channels available from the device associated with the audio context. In addition, Audio SGChannels can request channels in any order, such that data sent to an Audio SGChannel may be sent in a different order than it was received by audio context. Audio SGChannels can even request multiple copies of the same channel, if desired.

For example, Audio Device C 261 may be a device that produces 8 channels of audio data. Audio context 273 will de-interleave the data, if necessary, as it arrives from the input device component 252, and store the de-interleaved data in audio context 273's ring buffer 293. Suppose an application needs the first and second channels for a first track in a movie, and the third and fourth channels for a second track in a movie. In this example, two instantiations 223 and 224 of Audio SGChannel in FIG. 2 may be created by the application, one for each track. Audio SGChannel 223 connects to audio context 273 with connection id 283 and requests channels 1 and 2. Audio SGChannel 224 connects to audio context 273 with connection id 284 and requests channels 3 and 4. Each Audio SGChannel client can selectively read, or receive from audio context 273, only the channels it wants from audio context ring buffer 293.

In addition, in one embodiment, Audio SGChannels can request a channel of silence in addition to (or instead of) selected channels from an audio input device. For example, if an Audio SGChannel needs to create a stream of six channels for an application, but the audio input device only produces four, this feature can be used to add two channels of silence to the four channels produced by the audio device to create a 6-channel stream.

In the context of internet broadcasting, multiple instantiations of Audio SGChannels are useful to obtain the same audio data in different formats. For example, suppose an input device provides audio in 5.1 surround sound, and an application is developed to re-broadcast the audio data over the internet. Real-time re-broadcasting of 5.1 channel audio data would generally not be possible over the internet due to bandwidth restrictions as 5.1 channel data audio data is very large.

In this example, three instantiations of Audio SGChannel can be used to provide three different streams of audio data recorded at different data rates and compression, such that each can be re-broadcast as appropriate. For example, a first Audio SGChannel can grab all 5.1 channel data from the audio context associated with the input device, a second Audio SGChannel can grab the same data from the audio context as compressed Advanced Audio Coding (AAC) data, and a third Audio SGChannel can grab the data as a low bitrate stream of mixed down stereo sound (i.e., two channels). The audio data grabbed by the second Audio SGChannel is useful for re-broadcasting the data over broadband connections, while the audio data grabbed by the third Audio SGChannel is useful for re-broadcasting over slower connections. The application can use these three Audio SGChannels to capture the audio data for re-broadcasting in three (or more) formats, so that the re-broadcasting application can support a variety of client connection speeds. The audio device does not need to change operation in order for an application to make a multi-data rate movie that uses the same audio data as separate tracks stored at different data rates and different compressions. The audio input device simply plays what it has, and the application, through use of multiple Audio SGChannels and audio context, can use the input audio data in any format.

Some audio input devices only allow one client at a time. The audio data from these "exclusive access" devices cannot be shared by multiple clients. However, since audio context provides a "wrapper" for the audio input device, and can provide audio data to multiple clients through a single ring buffer, clients can effectively share an exclusive access device in one embodiment.

Using these disclosed techniques, multiple Audio SGChannels can share audio data from a common device. In addition, Audio SGChannels can grab any desired channel valiance, as Audio SGChannel clients are not required to gather data from all channels, even though audio context receives, de-interleaves and stores data from all channels. Furthermore, it is possible to grab data from multiple devices using multiple Audio SGChannels and store the audio data from separate devices as tracks in the same movie.

In one embodiment, the audio context wraps a device for both input and output. Thus, if an Audio SGChannel wishes to play a real-time preview of the data being captured, it may do so using the same audio context interface. It may preview the data to the same device from which it was captured, or to a different output device. Multiple Audio SGChannels can share common output device audio contexts just as they can share input device contexts, so audio from different sources may be previewed onto a common playback device. Mixing to the output device's channel valence and speaker layout is performed automatically by the audio context.

Ring Buffer

The audio context ring buffer is used to store data received from an audio device, while simultaneously allowing one or more Audio SGChannel clients to read from it. For example, in FIG. 2, ring buffer 293 of audio context 273 is accessed by Audio SGChannel clients 223 and 224.

A "ring buffer" is generally a circular queue primarily used for transmitting data between asynchronous processes, and is especially useful for applications that transfer audio data. Typically, a ring buffer is an array wherein each block of new data coming into the buffer is written right after the previous block, with wraparound to the beginning when the end of the buffer is reached. Processing of the data in a ring buffer takes place the same way, wrapping around to the beginning when the end of the buffer is reached. "Head" and "tail" position pointers are maintained so that the processing never goes past the end of the new data. Data is inserted at the buffer's back end (tail) and removed from the front end (head).

Figure 3:
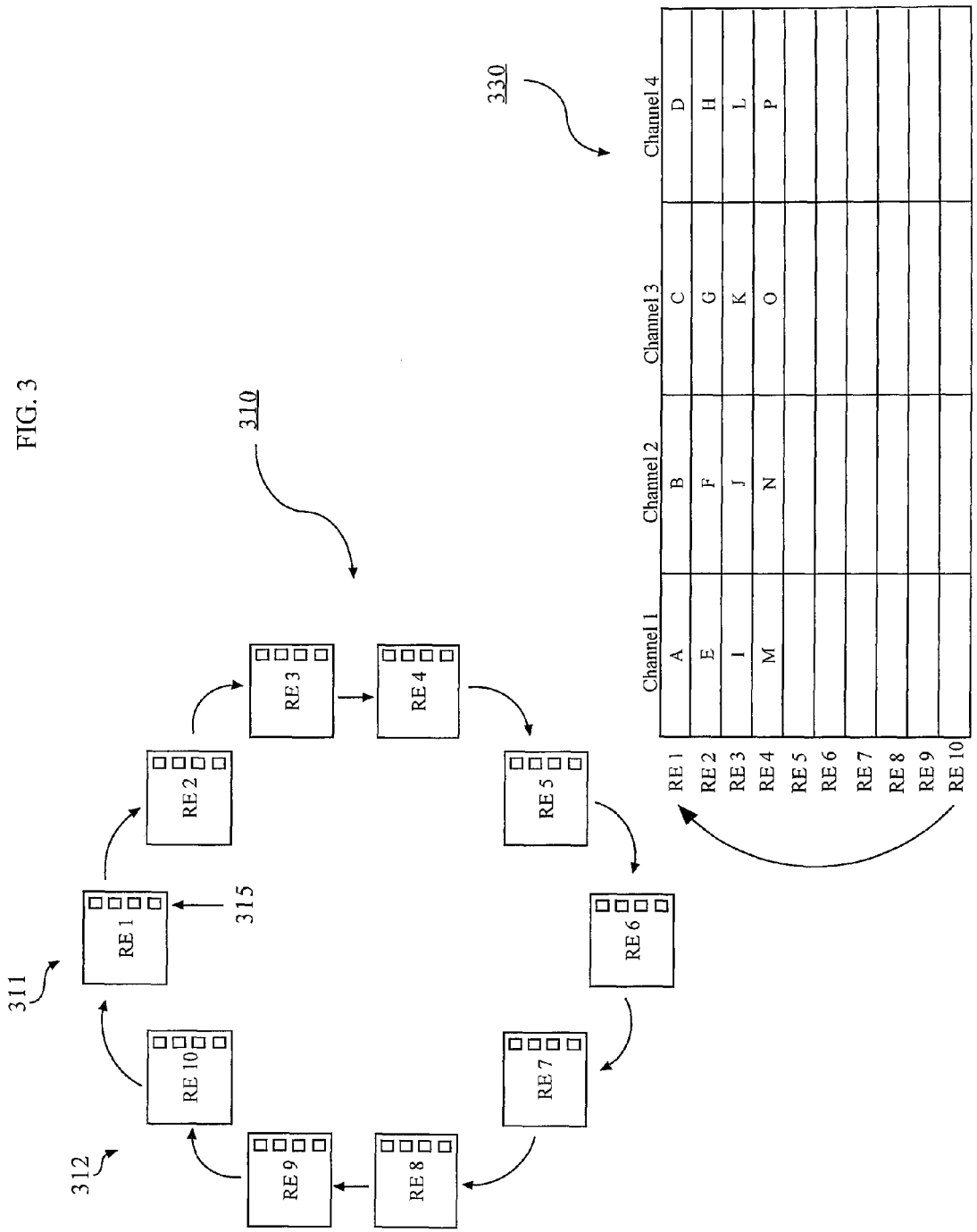
FIG. 3 illustrates an embodiment of a multi-channel audio context ring buffer.

FIG. 3 illustrates how a ring buffer for an audio context object is implemented in one embodiment of the present invention. The example ring buffer 310 shown in FIG. 3 illustrates a simple ring buffer containing ten ring buffer elements (RE1-RE10), however any number of ring elements can be used.

As shown in FIG. 3, at a high level, the ring buffer is a circular linked list, with the last ring element RE10 (312) pointing back to the first ring element RE1 (311). Typically, each ring buffer element is intended to receive a "push" of audio data from an audio input device component.

In one embodiment, audio context calculates the number of ring elements in the ring buffer as it allocates memory for the ring buffer. In one embodiment, audio context determines the number of ring elements through use of a parameter or configuration variable that stores the total buffer time, and by querying the audio device to determine how frequently chunks of audio data will be pushed to audio context. For example, suppose ring buffer 310 is intended to store 1 second of audio data coming from a 4-channel device. In this example, the audio is delivered in 1/10 of a second size chunks. In this example, it can be easily determined that a 10 ring element ring buffer is needed to store 1 second of data in 1/10 second chunks. Ring buffers containing more or fewer ring elements are of course possible. Other methods may be used to determine how many ring elements to use in the audio context ring buffer.

As shown by section 315 of ring element RE 1, the audio data received by that ring element is separated by channel and each channel is stored separately, in this example into 4 separate buffers for the 4 channels. Although the ring buffer 310 in FIG. 3 shows the separate channels being stored within the ring elements, in one embodiment, each ring element contains pointers to each channel of data, and the channels of audio data are stored separately from the ring elements.

Table 330 in FIG. 3 illustrates the ring buffer 310 as a conceptual two-dimensional table or array of de-interleaved audio samples from the example 4-channel audio device. As shown, each push of data is stored in a row of the table. The data stored in each row of the table is separated by channel, and stored in separate columns in the table. For example, suppose the data received in the first push is represented as "ABCD", where "A" represents channel 1 data, "B" represents channel 2 data, etc. As shown in table 330, each channel's data is stored in separate columns in row RE1.

When the next push of audio data is received, it is separated by channel and stored in the appropriate corresponding column of row RE2. For example, if the second push of data is represented by "EFGH", with "E" representing channel 1 data, etc., the push is stored in row RE2. As further pushes of data come in, they are de-interleaved and added to the table accordingly. Table 330 illustrates a time when 4 pushes of data represented by "ABCD", "EFGH", "IJKL" and "MNOP", corresponding to the 4 channels of data for each push, have been received and stored. When the table is full, it will start over with the next push of data overwriting any data in row RE1, and so forth.

At the beginning, the tail and the head for each SGChannel client points to RE1. As the audio context is associated with one device, it only needs to keep track of one "tail" as it only has one writer, i.e. the audio input device component. However, as an audio context can have multiple readers (Audio SGChannel clients), and the readers can pull different numbers and amounts of samples out of the audio context simultaneously, the audio context must track a separate ring buffer "head" for each Audio SGChannel client. In one embodiment, the audio context keeps a data structure for each SGChannel client with which it is associated. Within each data structure, it keeps track of that particular client's read element and offset within that element. Thus at any given time, the audio context is able to determine how many samples are available for any given SGChannel client as it keeps track of how much any given client has already consumed.

With each push, the tail is moved to the next row, and the head for an Audio SGChannel client remains pointing to RE1 until data is read by that Audio SGChannel client. Suppose after two pushes, a first Audio SGChannel client requests all channel 1 and channel 2 data. At this point, the tail points to RE3, as this is the next row to which a push of data will be added, and the head for the first Audio SGChannel client points to RE1, as no data has yet been read. Audio context can deliver the requested data by simply reading the Channel 1 and Channel 2 columns from the first Audio SGChannel's head (RE1) to the tail (RE3) in order. In this example, the sequence of data represented by AEBF will be received by the first Audio SGChannel client. If the first Audio SGChannel client had requested Channel 2, then Channel 1, the sequence of data represented by "BFAE" would instead be received by the first Audio SGChannel client.

Clients can request data in any size chunks, and do not have to request data in the size of the push in which it is delivered to audio context. Clients can request more or less data because no de-interleaving is necessary as the data has already been de-interleaved. Audio context simply delivers the amount of data in the buffer at the time of the request.

Each Audio SGChannel has its own ring buffer head, so that each Audio SGChannel can receive the amount of data that it wants without interfering with other Audio SGChannel clients. As mentioned above, the audio context keeps track of each Audio SGChannel's read element and current offset within that element. In one embodiment, Audio SGChannel clients pull out data by querying the audio context for a particular property in an API call. The audio context calculates the number of available frames for the particular Audio SGChannel client making the request, then the client pulls out that number of frames (samples) of audio data from audio context by calling another API function.

Using the example above, after reading the first two rows of data for Channel 1 and Channel 2, both the tail and the head for the first Audio SGChannel will point to RE3. Suppose the next two pushes of data are now received by the ring buffer, represented by "IJKL" and "MNOP" in rows RE3 and RE4, for channels 1-4 respectively. With the pushes, the tail will move to RE5, and the head for the first Audio SGChannel client remains at RE3. As described above, the first Audio SGChannel has already received Channel 1 and Channel 2 data for the first two pushes (rows) of data. When another request is received from the first Audio SGChannel, it will read data from the Channel 1 and Channel 2 columns from the head to the tail, i.e., rows RE3 and RE4. In this example, the data represented by "IMJN" will be received by the first Audio SGChannel client.

However, suppose a second Audio SGChannel client, which requests only Channel 1, now wants to receive the Channel 1 data. After 4 pushes, the tail has moved to RE5, but since no data has been read for this Audio SGChannel client yet, the head for this Audio SGChannel still points to RE1. The Audio SGChannel will receive the first four rows (RE1-RE4) of data for the Channel 1 column in a single request in this example. In this example, the second Audio SGChannel client receives the data represented by "AEIM."

As illustrated, Audio SGChannel clients can request data for any number of channels available in the ring buffer, and can also request different amounts of data in each request. The ability to request and receive varying amounts of data is important in many situations. For example, if a client is performing other functions, such as heavily processing the incoming audio data, it may not be possible to request and receive data as frequently as it is pushed. The audio context for this client may gather up several pushes of data before the client requests and receives the data. However, another client may be associated with an application that is capable of receiving audio pushes in real-time, and will request and receive the selected channels of each push as it comes in.

An advantage of using a 2-dimensional array to implement a ring buffer for multi-channel data is that the data can be stored and read sequentially by channel. That is, each column of the table is stored as a contiguous block. This enables a client to receive multiple pushes of data for that Channel with a single read. For example, in the example of FIG. 3, Channel 1 data is stored as AEIM in a single contiguous block. This enables any size of request to be performed with only a single read of the buffer—the data is not fragmented throughout the buffer. Clients can efficiently grab larger chunks of data on a less frequent basis, if needed. This is different from other ring buffers that store data directly in the ring buffer elements, or where each ring element is associated with a separate buffer. In these cases, multiple reads of separate buffers associated with different ring elements may be needed in order to fulfill a request.

Figure 4:
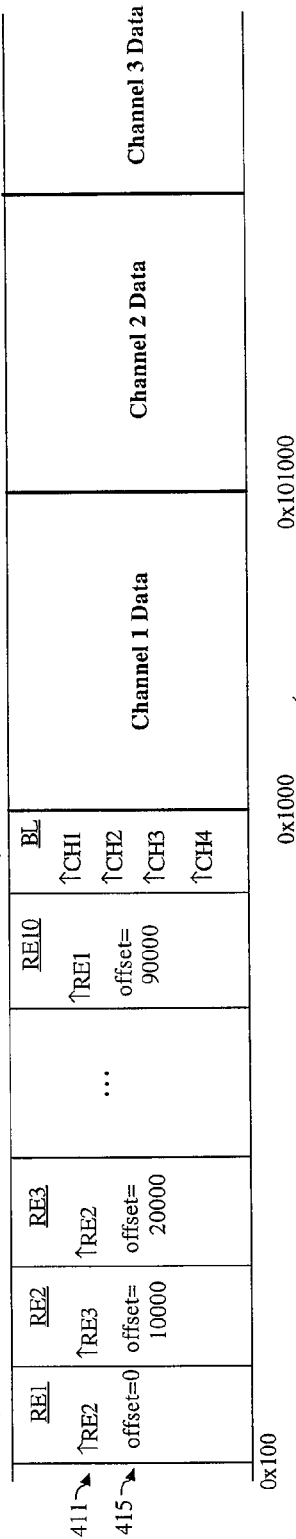
FIG. 4 illustrates an embodiment of a physical layout of the ring buffer of FIG. 3.
Figure 4:
Figure 4:
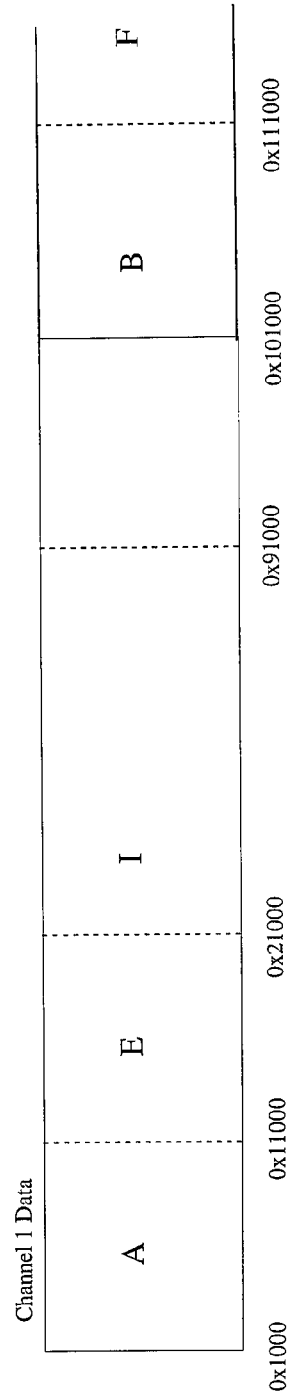

There are many ways of implementing the 2-dimensional table 330. FIG. 4 illustrates one embodiment of a physical structure for the table. As shown in FIG. 4, data structure 410 is used to store the entire ring buffer 310. In this example, memory is allocated for the ring buffer starting at memory location 0x100. The first ring element RE1 is stored starting at this location, and is typically accessed by a pointer. When memory at this address is accessed, it is interpreted to be a data structure that holds ring element data. For example RE1 may be a data structure that contains various information such as timestamps, audio push identification information, such as a seed counter, audio sample offset information, number of samples or frames contained in a buffer, a pointer to the next ring element, etc. Various types of information that can be stored will be apparent to those skilled in the art.

Each ring element is stored at a particular location in the data structure. Each ring element contains a pointer to the next ring element, and the last ring element contains a pointer to the first ring element. In the example of FIG. 4, the "next" pointer 411 for RE1 may be determined by using the start address of RE+the byte size of RE1. This will point to the start of RE2. Other techniques for implementing the data structure and calculating the locations of ring elements will be apparent to those skilled in the art.

In addition, in one embodiment each ring element may contain one or more offsets that can be used to determine a location of the channel data for that ring element, as shown by offset 415. Offsets will be discussed in more detail below.

In one embodiment, ring buffer data structure 410 also contains a Buffer List, shown as BL 440. The Buffer List is a variable length structure holding pointers to the starting point of each channel's actual data. The Buffer List is used in conjunction with the offsets in the ring elements to determine where in each channel's buffer the portion of data that corresponds to that ring element is stored. In this example, the Buffer List may have a pointer to memory location 0x1000 for Channel 1, memory location 0x101000 for Channel 2, etc.

For example, suppose one second of data will have 100,000 bytes. Each push of data (1/10 second) will deliver 10,000 bytes. In this example, the offsets for each ring element can be determined as:

$RE1.\text{offset} = 0$ $RE2.\text{offset} = 10000$ $RE3.\text{offset} = 20000$

...

$RE10 \text{ offset} = 90000$

When the first push of 10,000 bytes arrives at audio context, it is de-interleaved (if necessary), and Channel 1's data is written to Channel 1's start address (found in the Buffer List to be 0x1000)+RE1.offset; Channel 2's data is written to Channel 2's start address (0x101000)+RE1.offset, etc. In this example, RE1.offset is 0, so the data is stored at the start of each Channel's buffer. For example, Channel 1's data for ring element RE1, represented by "A", is stored at location 0x1000, and Channel 2's data for ring element RE1, represented by "B" is stored at 0x101000.

When the second push of 10,000 bytes arrives, it is de-interleaved, and Channel 1's data for ring element RE2, represented by "E", is written to Channel 1's start address+RE2.offset. In this example, the data represented by "E" is written to 0x11000. (0x1000+10000=0x11000). Channel 2's data, represented by "F", is written to Channel 2's start address+RE2.offset, or (0x101000+10000) 0x111000. In this manner, each channel's data is stored as a separate contiguous block.

Other implementations of the 2-dimensional array 330 are possible without using the physical structure illustrated in FIG. 4. In addition, while described in the context of a ring buffer for an audio context object, the multi-channel ring buffer techniques disclosed herein can be used in other applications, such as an application that plays multiple channels of audio data.

Through a ring buffer created using the techniques described herein, audio context can deliver any amount of data at any time for any client.

Hardware Overview

Figure 5:
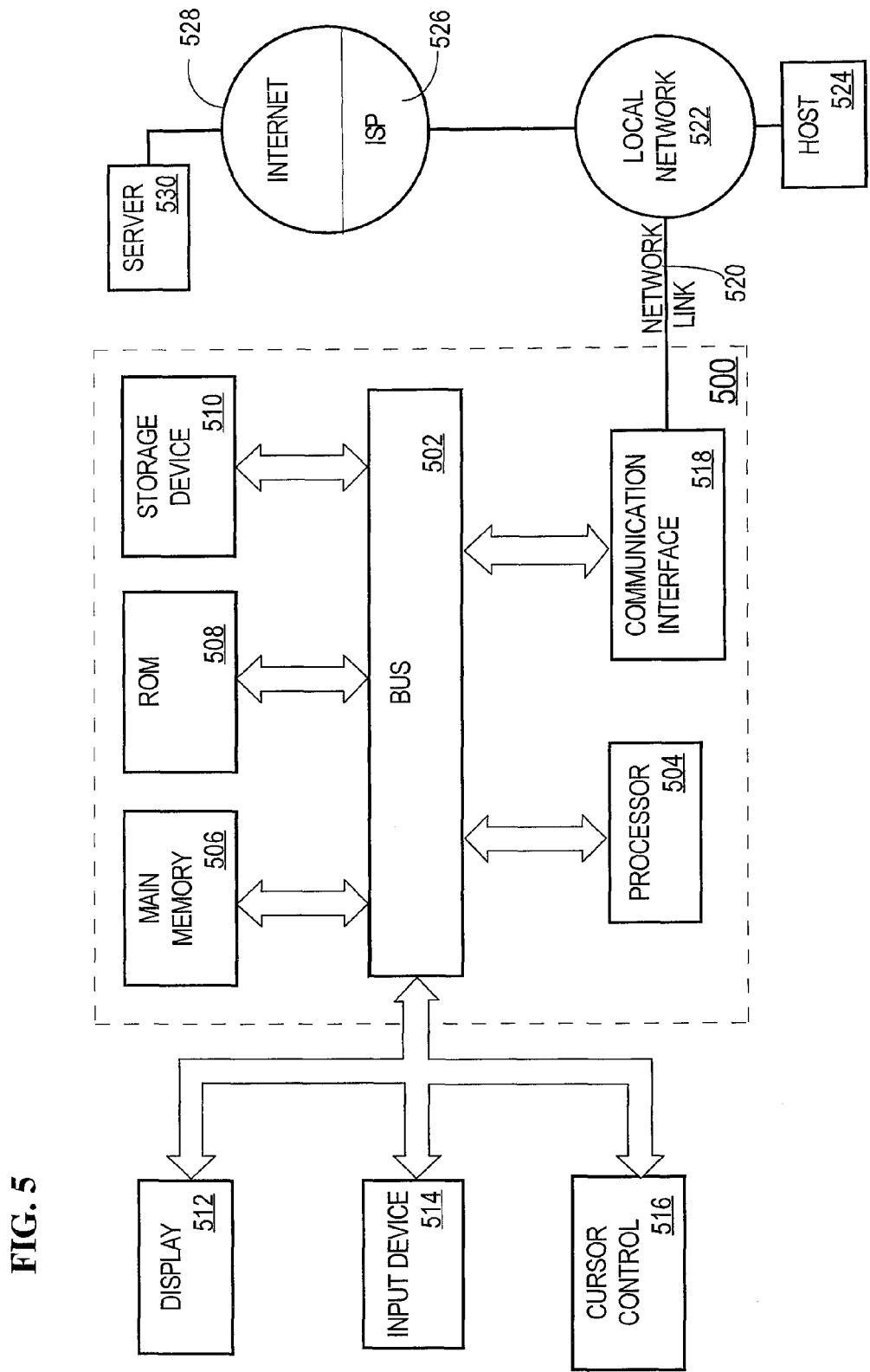
FIG. 5 is a block diagram illustrating a computer system upon which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
receiving a first audio stream having one or more channels of audio data;
storing audio data of each channel of the one or more channels of the first audio stream contiguously in a section of a first buffer corresponding o the channel, the first buffer having one or more sections corresponding to the one or more channels of the first audio stream;
receiving a second audio stream having one or more channels of audio data;
storing audio data of each channel of the one or more channels of the second audio stream contiguously in a section of a second buffer corresponding to the channel, the second buffer having one or more sections corresponding to the one or more of channels of the second audio stream;
prior to receiving a first request from a client for audio data of at least one channel of the first audio stream, maintaining first pointer information that represents a current read location in the first buffer;
prior to receiving a second request from the client for audio data of at least one channel of the second audio stream, maintaining second pointer information that represents a current read location in the second buffer;
in response to the first request, using the first pointer information to provide to the client audio data of the at least one channel of the first audio stream from the corresponding section of the first buffer in which audio data of the at least one channel of the first audio stream is stored, and updating the first pointer information to reflect a current read location in the first buffer; and
in response to the second request, using the second pointer information to provide to the client audio data of the at least one channel of the second audio stream from the corresponding section of the second buffer in which audio data of the at least one channel of the second audio stream is stored, and updating the second pointer information to reflect a current read location in the second buffer;
wherein the method is performed by a computing device.

2. The method according to claim 1,
wherein the one or more channels of audio data of the first audio stream, when combined, constitute an overall audio composition; and
wherein the one or more channels of audio data of the second audio stream, when combined, constitute an overall audio composition.

3. The method according to claim 1, wherein the one or more channels of audio data of the first audio stream are received interleaved, the method further comprising:
prior to storing audio data of each channel of the one or more channels of the first audio stream in the first buffer, de-interleaving the one or more channels of audio data of the first audio stream.

4. The method according to claim 1, wherein the first and second buffers are ring buffers.

5. The method according to claim 1, wherein the first audio stream has more than two channels of audio data.

6. The method according to claim 1, further comprising:
receiving a plurality of requests from a plurality of clients, wherein each request of the plurality of requests requests audio data of at least one channel of the one or more channels of the first audio stream;
in response to each request of the plurality of requests, providing, to a client of the plurality of clients, audio data of the at least one channel requested by the request from the corresponding section of the first buffer in which audio data of the least one channel requested by the request is stored;
wherein the plurality of clients includes the first client, the second client, and at least one other client;
wherein the plurality of requests includes the first request, the second request, and at least one other request.

7. One or more non-transitory computer-readable media storing instructions which, when executed by one or more computing devices, cause performance of a method according to claim 1.

8. One or more non-transitory computer-readable media storing instructions which, when executed by one or more computing devices, cause performance of a method according to claim 2.

9. One or more non-transitory computer-readable media storing instructions which, when executed by one or more computing devices, cause performance of a method according to claim 3.

10. One or more non-transitory computer-readable media storing instructions which, when executed by one or more computing devices, cause performance of a method according to claim 4.

11. One or more non-transitory computer-readable media storing instructions which, when executed by one or more computing devices, cause performance of a method according to claim 5.

12. One or more non-transitory computer-readable media storing instructions which, when executed by one or more computing devices, cause performance of a method according to claim 6.

13. The method according to claim 1, wherein each section of the plurality of sections corresponds to a contiguous block of computer memory.

14. A method comprising:
receiving an audio stream having a plurality of channels of audio data;
storing audio data of each channel of the plurality of channels contiguously in a section of a buffer corresponding to the channel, the buffer having a plurality of sections corresponding to the plurality of channels;
prior to receiving a first request from a first client for one or more channels of the plurality of channels of audio data, maintaining first pointer information that indicates a current read location in the buffer;
prior to receiving a second request from a second client for one or more channels of the plurality of channels of audio data, maintaining second pointer information that indicates a current read location in the buffer;
in response to the first request, providing to the first client audio data of each requested channel of the first request from the corresponding section of the buffer in which audio data of the requested channel is stored, and updating the first pointer information to indicate a current read location in the buffer;
in response to the second request, providing to the second client audio data of each requested channel of the second request from the corresponding section of the buffer in which audio data of the requested channel is stored, and updating the second pointer information to indicate a current read location in the buffer;
wherein the method is performed by a computing device.

15. The method according to claim 14, wherein the plurality of channels of audio data, when combined, constitute an overall audio composition.

16. The method according to claim 14, wherein the plurality of channels of audio data are received interleaved, the method further comprising:
prior to storing audio data of each channel of the plurality of channels in the buffer, de-interleaving the plurality of channels of audio data.

17. The method according to claim 14, wherein the buffer is a ring buffer.

18. The method according to claim 14, further comprising:
receiving another audio stream having one or more channels of audio data;
storing audio data of each channel of the one or more channels of the other audio stream in a section of another buffer corresponding to the channel, the other buffer having one or more sections corresponding to the one or more channels of the other audio stream;
receiving another request from the first client for audio data of at least one channel of the other audio stream; and
in response to the other request, providing to the first client audio data of the at least one channel of the other audio stream from the corresponding section of the other buffer in which audio data of the at least one channel of the other audio stream is stored.

19. The method according to claim 14, further comprising:
receiving a plurality of requests from a plurality of clients, wherein each request of the plurality of requests requests audio data of at least one channel of the plurality of channels;
in response to each request of the plurality of requests, providing, to a client of the plurality of clients, audio data of the at least one channel requested by the request from the corresponding section of the buffer in which audio data of the least one channel requested by the request is stored;
wherein the plurality of clients includes the first client, the second client, and at least one other client.

20. One or more non-transitory computer-readable media storing instructions which, when executed by one or more computing devices, cause performance of a method according to claim 14.

21. One or more non-transitory computer-readable media storing instructions which, when executed by one or more computing devices, cause performance of a method according to claim 15.

22. One or more non-transitory computer-readable media storing instructions which, when executed by one or more computing devices, cause performance of a method according to claim 16.

23. One or more non-transitory computer-readable media storing instructions which, when executed by one or more computing devices, cause performance of a method according to claim 17.

24. One or more non-transitory computer-readable media storing instructions which, when executed by one or more computing devices, cause performance of a method according to claim 18.

25. One or more non-transitory computer-readable media storing instructions which, when executed by one or more computing devices, cause performance of a method according to claim 19.

26. A method comprising:
receiving an audio stream having multiple channels of audio data;
storing audio data of each of the multiple channels in a section of a buffer corresponding to the channel, the buffer having multiple sections corresponding to the multiple channels;
receiving a plurality of requests from a plurality of clients;
wherein each request of the plurality of requests requests audio data of at least one channel of the multiple channels;
wherein at least two requests of the plurality of requests request the same channel of the multiple channels;
in response to each request of the plurality of requests, providing, to a client of the plurality of clients, audio data of the at least one channel requested by the request from the corresponding section of the buffer in which audio data of the least one channel requested by the request is stored;
wherein the method is performed by one or more computing devices.

27. The method according to claim 26, wherein the multiple channels of audio data, when combined, constitute an overall audio composition.

28. The method according to claim 26 wherein the multiple channels of audio data
are received interleaved, the method further comprising:
prior to storing audio data of each of the multiple channels in the buffer, de-interleaving the multiple channels of audio data.

29. The method according to claim 26, wherein the buffer is a ring buffer.

30. The method according to claim 26, wherein the audio stream has more than two channels of audio data, and wherein receiving the plurality of requests includes receiving a particular request from a particular client of the plurality of clients for at least three channels of the more than two channels of audio data, the method further comprising:
in response to the particular request, providing to the particular client, for each requested channel of the at least three channels, audio data of the requested channel from the corresponding section of the buffer in which audio data of the requested channel is stored.

31. The method according to claim 26, further comprising:
receiving another audio stream having one or more channels of audio data;
storing audio data of each channel of the one or more channels of the other audio stream in a section of another buffer corresponding to the channel, the other buffer having a plurality of corresponding sections;
receiving a particular request from a particular client for audio data of at least one channel of the other audio stream; and
in response to the particular request, providing to the particular client audio data of the at least one channel of the other audio stream from the corresponding section of the other buffer in which audio data of the at least one channel of the other audio stream is stored.

32. The method according to claim 26, wherein receiving the audio stream includes receiving a plurality of audio data pushes, each audio data push of the plurality of audio data pushes having audio data of each channel of the multiple channels; and wherein storing the audio data of each channel of the multiple channels in the buffer includes separating each audio data push of the plurality of audio data pushes into channel-specific audio data, and storing each channel specific audio data contiguously in the section of the buffer corresponding to the channel.

33. One or more non-transitory computer-readable media storing instructions which, when executed by one or more computing devices, cause performance of a method according to claim 26.

34. One or more non-transitory computer-readable media storing instructions which, when executed by one or more computing devices, cause performance of a method according to claim 27.

35. One or more non-transitory computer-readable media storing instructions which, when executed by one or more computing devices, cause performance of a method according to claim 28.

36. One or more non-transitory computer-readable media storing instructions which, when executed by one or more computing devices, cause performance of a method according to claim 29.

37. One or more non-transitory computer-readable media storing instructions which, when executed by one or more computing devices, cause performance of a method according to claim 30.

38. One or more non-transitory computer-readable media storing instructions which, when executed by one or more computing devices, cause performance of a method according to claim 31.

39. One or more non-transitory computer-readable media storing instructions which, when executed by one or more computing devices, cause performance of a method according to claim 13.

40. One or more non-transitory computer-readable media storing instructions which, when executed by one or more computing devices, cause performance of a method according to claim 32.

* * * * *